US012576387B2

(12) United States Patent
Murai et al.

(10) Patent No.: US 12,576,387 B2
(45) Date of Patent: Mar. 17, 2026

(54) POROUS METAL-ORGANIC FRAMEWORK, METHOD FOR PRODUCING THE SAME, ADSORBENT, AND METHOD FOR SEPARATING CARBON DIOXIDE

(71) Applicants: KABUSHIKI KAISHA TOSHIBA, Tokyo (JP); TOSHIBA ENERGY SYSTEMS & SOLUTIONS CORPORATION, Kawasaki (JP)

(72) Inventors: Shinji Murai, Sagamihara Kanagawa (JP); Yasuhiro Kato, Machida Tokyo (JP); Hayato Morigaki, Yokohama Kanagawa (JP); Koshito Fujita, Yokohama Kanagawa (JP); Satoshi Saito, Yamato Kanagawa (JP)

(73) Assignees: KABUSHIKI KAISHA TOSHIBA, Tokyo (JP); TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 407 days.

(21) Appl. No.: 18/183,525

(22) Filed: Mar. 14, 2023

(65) Prior Publication Data
US 2023/0330626 A1 Oct. 19, 2023

(30) Foreign Application Priority Data

Apr. 18, 2022 (JP) ................................. 2022-068491

(51) Int. Cl.
| | |
|---|---|
| *B01J 20/22* | (2006.01) |
| *B01D 53/04* | (2006.01) |
| *B01D 53/047* | (2006.01) |
| *B01J 20/30* | (2006.01) |

(52) U.S. Cl.
CPC ........ *B01J 20/226* (2013.01); *B01D 53/0462* (2013.01); *B01D 53/047* (2013.01); *B01J 20/3078* (2013.01); *B01D 2253/204* (2013.01); *B01D 2257/504* (2013.01)

(58) Field of Classification Search
CPC .................. B01J 20/226; B01J 20/3078; B01J 2220/4812; B01D 53/0462; B01D 53/04; B01D 53/047; B01D 2253/204; B01D 2257/504; B01D 53/02; Y02C 20/40; C08G 83/008; C07F 3/003; C07C 55/07; C07D 213/06; C07D 213/22; C07D 295/027
USPC ............... 96/108; 95/139; 502/401; 423/230
See application file for complete search history.

(56) References Cited

U.S. PATENT DOCUMENTS

| | | | |
|---|---|---|---|
| 9,782,745 B2 | 10/2017 | Shimizu et al. | |
| 11,230,562 B2 | 1/2022 | Taylor et al. | |
| 2021/0179638 A1* | 6/2021 | Taylor .................. | B01J 20/2808 |
| 2024/0190898 A1* | 6/2024 | Ghaffari-Nik .......... | C07F 3/003 |

FOREIGN PATENT DOCUMENTS

| | | |
|---|---|---|
| JP | H09-227571 A | 9/1997 |
| JP | 2016-516677 A | 6/2016 |
| JP | 6586366 B2 | 10/2019 |
| JP | 2021-522226 A | 8/2021 |
| WO | WO-2013/069721 A1 | 5/2013 |

OTHER PUBLICATIONS

Zhai et al. "Colgand Modulated Six-, Eight-, and Ten-Connected Zn/Cd-1,2,4-Triazolate Frameworks Based on Mono-, Bi-, Tri-, Penta-, and Heptanuclear Cluster Units," Crystal Groth & Design, vol. 7, No. 11, 2332-2342, published Oct. 13, 2007.*

Lunxi Li et al., "One-step fabrication of ZIF-8/polymer composite spheres by a phase inversion method for gas adsorption", Colloid Polym Sci, Jul. 14, 2013, 291, pp. 2711-2717 (7 pages).

Qiuping Qian et al., "One-step Preparation of Macroporous Polymer Particles with Multiple Interconnected Chambers: A Candidate for Trapping Biomacromolecules", Angewandte Chemie International Edition, Aug. 12, 2013, 52, pp. 10625-10629 (5 pages).

UK Office Action issued on Jun. 6, 2024, to the UK Patent Application No. GB 2303329.3 (3 pages).

Zhang et al., "Chiral and achiral imidazole-linked tetrahedral zinc phosphonate frameworks with photoluminescent properties", The Royal Society of Chemistry; Dalton Transactions, 2014, vol. 43, No. 1 (pp. 285-289).

Luo et al., "Isostructural lanthanide-based metal-organic frameworks: structure, photoluminescence and magnetic properties," The Royal Society of Chemistry; Dalton Transactions, 2018, vol. 47, No. 3 (pp. 925-934).

Qu et al., "Stable Tb(III)-Based Metal-Organic Framework: Structure, Photoluminescence, and Chemical Sensing of 2-Thiazolidinethione-4-carboxylic Acid as a Biomarker of CS2," Inorganic Chemistry, Dec. 14, 2018, vol. 58 (pp. 524-534).

Wang et al., "A stable and highly luminescent 3D Eu(III)-organic framework for the detection of colchicine in aqueous environment," Environmental Research, Jan. 6, 2022, vol. 208, Article No. 112652 (pp. 1-9).

JP Office Action for JP Appl. Ser. No. 2022-068491 dated Sep. 12, 2025 (8 pages).

* cited by examiner

*Primary Examiner* — Frank M Lawrence, Jr.
(74) *Attorney, Agent, or Firm* — Foley & Lardner LLP

(57) ABSTRACT
A porous metal organic framework having gas adsorption selectivity and excellent water resistance, an adsorbent consisting of the porous metal organic framework, and a method for separating carbon dioxide using the same are provided, which are: a porous metal organic framework, which is characterized by comprising a metal oxalate, a cycloazocarbyl compound, and a bidentate organic ligand; an adsorbent consisting of the porous metal organic framework; and a method for separating carbon dioxide using the same.

5 Claims, No Drawings

POROUS METAL-ORGANIC FRAMEWORK, METHOD FOR PRODUCING THE SAME, ADSORBENT, AND METHOD FOR SEPARATING CARBON DIOXIDE

CROSS REFERENCE TO RELATED APPLICATIONS

This application is based upon and claims the benefit of priority from the prior Japanese Patent Application No. 2022-068491, filed on Apr. 18, 2022, the entire contents of which are incorporated herein by reference.

TECHNICAL FIELD

Embodiments of the present invention relate to a porous metal organic framework, a method for producing the same, an adsorbent consisting of a porous metal organic framework, and a method for separating carbon dioxide using the porous metal organic framework.

In recent years, the greenhouse effect due to the increase in carbon dioxide ($CO_2$) concentration has been pointed out as one of the causes of the global warming phenomenon, and there is an urgent need for international measures to protect the environment on a global scale. Industrial activities are a major source of $CO_2$ emissions, and there is a growing trend toward reducing $CO_2$ emissions. Separation and recovery techniques for suppressing increases in the concentration of acid gases such as $CO_2$ are known.

The chemical absorption method is known as an acidic gas separation technology that has been researched and developed so far. However, in general, the separation and recovery energy is significant, and the adsorption liquid decomposes during operation, reducing the efficiency of separation and recovery or the like, which is considered problematic.

Meanwhile, as a technology to replace the chemical adsorption method, gas storage systems and gas separation systems using solid gas adsorbents are being developed. Activated carbon, zeolite, and the like are known as gas adsorbents, and a method of occluding gas in a porous metal organic framework (MOF) has also been proposed.

MOF is a network-like solid in which metal ions are linked by organic spacers, and pores capable of adsorbing gas molecules are regularly formed such that MOF can adsorb a large amount of gas. In addition, the feature of such a solid gas adsorbent is that it physically adsorbs $CO_2$, and the interaction with $CO_2$ is small compared to the chemical absorption method for chemical binding, and less energy is required due to the release of gas.

However, as far as the present inventors know, conventionally proposed MOFs have insufficient gas adsorption. Further, since they are decomposed by water which decreases the adsorption amount, they are required to have improved durability against water. Therefore, water-resistant MOFs are also being studied. For example, a MOF formed from zinc oxalate and a cycloazocarbyl compound and a MOF consisting of a polycarboxylic acid compound, at least one metal ion selected from ions of metals belonging to Groups 2 to 13 of the periodic table, an organic ligand capable of multidentate coordination with the metal ion, and an aliphatic monocarboxylic acid compound are being studied, there is a demand for a further increase in the adsorption amount.

SUMMARY OF INVENTION

An object of the present invention according to embodiments is to provide a porous metal organic framework having high water resistance and high adsorption capacity, a method for producing the same, an adsorbent consisting of the porous metal organic framework, and a method for separating carbon dioxide.

The present inventors accumulated extensive research to solve the problems described above. As a result, they found that a specific porous metal organic framework has high levels of both water resistance and gas adsorption capacity. This has led to the completion of the present invention.

Therefore, a porous metal organic framework according to embodiments of the present invention is characterized by comprising a metal oxalate, a cycloazocarbyl compound, and a bidentate organic ligand.

A method for producing a porous metal organic framework according to embodiments of the present invention is characterized by comprising subjecting a metal oxalate, a cycloazocarbyl compound, and an organic ligand capable of bidentate coordination to a temperature condition of from 100° C. to 250° C. in the presence of a mixed solvent containing water and alcohol.

An adsorbent according to embodiments of the present invention is characterized by comprising the porous metal organic framework.

A method for separating carbon dioxide according to embodiments of the present invention is characterized by comprising the following steps (a) and (b):

step (a): a step of bringing a carbon dioxide-containing gas into contact with the porous metal organic framework, thereby allowing the porous metal organic framework to adsorb carbon dioxide in the carbon dioxide-containing gas; and step (b): a step of desorbing carbon dioxide adsorbed on the porous metal organic framework from the carbon-dioxide-adsorbed porous metal organic framework obtained in step (a).

Advantageous Effects of Invention

The porous metal organic framework according to embodiments of the present invention has gas adsorption selectivity, can adsorb more carbon dioxide than it can adsorb nitrogen, and has excellent water resistance.

DETAILED DESCRIPTION OF THE INVENTION

Hereinafter, the embodiments will be described in detail.
<Porous Metal Organic Framework>

The porous metal organic framework according to embodiments of the present invention is characterized by comprising a metal oxalate, a cycloazocarbyl compound, and a bidentate organic ligand.

The phrase "comprising a metal oxalate, a cycloazocarbyl compound, and a bidentate organic ligand" used herein does not mean comprising only the listed three components (i.e., three components: a "metal oxalate," a "cycloazocarbyl compound," and a "bidentate organic ligand") but also means comprising the listed three components and components other than them.

In a porous metal organic framework according to embodiments of the present invention, the molar ratio of the cycloazocarbyl compound to the metal oxalate is preferably from 2 to 6, especially from 3 to 5. When the molar ratio of the cycloazocarbyl compound to the metal oxalate is less than 2, it can cause a problem of no pore formation. In a particularly preferred embodiment, an excess of 2 mol or more of the cycloazocarbyl compound can be used per 1 mol of the metal oxalate.

In a porous metal organic framework according to embodiments of the present invention, the molar ratio of the bidentate organic compound to the cycloazocarbyl compound is preferably from 0.02 to 0.1, particularly preferably from 0.03 to 0.07. When the molar ratio of the bidentate organic compound to the cycloazocarbyl compound is less than 0.02, the effect of bidentate ligands is insufficient. When it exceeds 0.1, it may interfere with a pore-forming reaction, which is not preferable.

The average size of pores present in the porous metal organic framework is preferably from 0.3 nm to 20 nm, particularly preferably from 0.5 nm to 10 nm. Here, the average pore size is that when evaluated by the BJH method.

A porous metal organic framework according to embodiments of the present invention has gas adsorption selectivity and thus can adsorb more carbon dioxide than it can adsorb nitrogen. In addition, a porous metal organic framework according to embodiments of the present invention also has water resistance, which is excellent in that, for example, the water resistance evaluated by the hydrolysis test method comprising exposure to water vapor at 120° C. for one week shows almost no change in the amount of gas adsorption before and after the test.

<Metal Oxalate>

In embodiments of the present invention, a metal that constitutes the metal oxalate is a divalent metal. Examples of preferred metals can include zinc ion ($Zn^{2+}$), cobalt ion ($Co^{2+}$), nickel ion ($Ni^{2+}$), and copper ion ($Cu^{2+}$). Of these, zinc ion ($Zn^{2+}$) is particularly preferable.

A porous metal organic framework according to embodiments of the present invention can be obtained using preferably a raw material containing a metal oxalate. As such a raw material containing a metal oxalate is one consisting of a metal oxalate (i.e., one with a purity of metal oxalate of 100%) can be used. Those with a purity of metal oxalate of from 95% to 100% by weight are preferable, and those with a purity of metal oxalate of from 99.5% to 100% are particularly preferable. When the raw material contains a plurality of types of metal oxalates, the purity of the type of metal oxalate having a relatively large amount is specified above.

It has been confirmed in embodiments of the present invention that when the purity of metal oxalate is from 95% to 100% by weight, it is excellent in that the amount of gas adsorption is improved by the effect of the bidentate ligand, compared to when the purity is higher (from more than 99.5% to 100%).

In general, raw materials with a purity of from 95% to 100% are easier to obtain and less expensive than high-purity raw materials. Therefore, a porous metal organic framework according to embodiments of the present invention has not only its characteristic advantages but also economically and industrially practical advantages.

<Cycloazocarbyl Compound>

Preferred examples of a cycloazocarbyl compound can include 5-membered heterocyclic compounds having 2 to 4 nitrogen atoms.

Specific examples of such compounds can include imidazole compounds, triazole compounds, and tetrazole compounds. In particular, 1,2,4-triazole compounds can be mentioned. Specific examples of other cycloazocarbyl compounds can include 1H-1,2,4-triazolate-1-carboxamidine, 3-amino-1,2,4-triazolate, imidazolate, 4-fluoroimidazolate, 2-methyl-imidazolate, and 1,2,3,4-tetrazolate. In particular, 1,2,4-triazolate is preferable. These cycloazocarbyl compounds can be used singly or in a combination of two or more kinds thereof.

<Bidentate Organic Ligand>

Examples of preferred bidentate organic ligands in embodiments of the present invention can include those selected from the following compounds:

1,4-diazabicyclo[2.2.2]octane, pyrazine, 2,5-dimethylpyrazine, 3,3'-bipyridyl, 4,4'-bipyridyl, 2,2'-dimethyl-4,4'-bipyridine, 1,2-bis(4-pyridyl)ethane, 1,2-bis(4-pyridyl)ethylene, 1,2-bis(4-pyridyl)ethyne, 1,3-bis(4-pyridyl)propane, 1,4-bis(4-pyridyl)butane, 1,4-bis(4-pyridyl)butadiyne, 1,4-bis(4-pyridyl)benzene, 3,6-di(4-pyridyl)-1,2,4,5-tetrazine, 2,2'-bi-1,6-naphthyridine, phenazine, diazapyrene, 2,6-di(4-pyridyl)-benzo[1,2-c:4,5-c']dipyrrole-1,3,5,7 (2H,6H)-tetoron, 4,4'-bis(4-pyridyl)biphenylene, N,N'-di(4-pyridyl)-1,4,5,8-naphthalenetetracarboxydiimide, trans-1,2-bis(4-pyridyl)ethene, 4,4'-azopyridine, 1,2-bis(4-pyridyl)ethane, 4,4'-dipyridyl sulfide, 1,2-bis(4-pyridyl)propane, 1,2-bis(4-pyridyl)-glycol, N-(4-pyridyl)isonicotinamide, piperazine, and 2-methylpiperazine.

The above-described organic ligands capable of bidentate coordination can be used singly or in a combination of two or more kinds thereof.

Preferred bidentate organic ligands in embodiments of the present invention are 1,2-di(4-pyridyl)ethylene, 1,3-di(4-pyridyl)propane, 3,3'-bipyridyl, and piperazine.

Tridentate ligands such as 2,4,6-tri (4-pyridyl)-1,3,5-triazine and tetradentate ligands such as tetrakis(3-pyridyloxymethylene) methane and tetrakis(4-pyridyloxymethylene) methane can also be used as long as the effect of the present invention is not impaired.

<Method for Producing Porous Metal Organic Framework>

A method for producing a porous metal organic framework according to embodiments of the present invention is characterized by comprising subjecting a metal oxalate, a cycloazocarbyl compound, and an organic ligand capable of bidentate coordination to a temperature condition of from 100° C. to 250° C. in the presence of a mixed solvent containing water and alcohol.

The above-described method for producing a porous metal organic framework according to the embodiments can be understood as a method comprising a step of combining a metal oxalate compound and a cycloazocarbyl compound to form a reaction mixture and a step of reacting the compound in the reaction mixture at a selected temperature.

The reaction step can be carried out in the presence of water, an organic solvent, or a mixture thereof. In a specific embodiment, the reaction solvent is a mixture of water and an organic solvent. In particular, alcohol can be used as an organic solvent.

The reaction can be carried out in the presence of water and at least one type of alcohol, preferably a lower alcohol (methanol, ethanol, propanol, or butanol, particularly preferably methanol). The volume ratio of alcohol to water is preferably from 0.1 to 10, more preferably from 0.2 to 10.

The reaction temperature is from 100° C. to 250° C., preferably from 150° C. to 200° C. In addition, a step of increasing the temperature from a specific temperature to a target temperature and a step of decreasing the target temperature to a specific temperature may be further included. Heating is preferably carried out in a pressure-resistant container. The reaction time is preferably from 1 hour to 60 hours, particularly preferably from 2 hours to 50 hours.

According to the above-described method for producing a porous metal organic framework according to embodiments of the present invention, a powdery porous metal organic framework having an average particle size of from 0.05 μm to 5 μm, especially from 0.1 μm to 3 μm, can be obtained. Here, the average particle size is that when evaluated by SEM.

Such a powdery porous metal organic framework can be made into pellets (granules), if necessary. The size of pellets (granules) is preferably from 0.1 mm to 5 mm, especially from 0.5 mm to 3 mm, in terms of average particle size. Here, the size of pellets (granules) is that when evaluated by a stereomicroscope.

A method for forming a powdery porous metal organic framework into pellets can be a method for making a powder into a granulation liquid (including a polymer and an organic solvent, optionally containing a surfactant) to form granules having a desired particle size. Preferably, for example, a method using polysulfone [L. Li, J. Yao, P. Xiao, J. Shang, Y. Feng, P. A. Webley, H. Wang, Colloid Polym. Sci. 2013, 291, 2711-2717], a method using polylactic acid [Q. Qian, X. Huang, X. Zhang, Z. Xie, Y. Wang, Angew. Chem. Int. Ed. 2013, 52, 10625-10629], or the like can be employed.

<Activation of Metal Organic Framework>

The powdery metal organic framework and the pellet (granule)-like metal organic framework according to embodiments of the present invention can be subjected to an activation treatment, if necessary.

For example, the powdery porous metal organic framework or pellet (granule)-like metal organic framework can be subjected to a temperature condition of 40° C. to 200° C. under reduced pressure of not more than 10-1 Pa so as to be activated. Here, the activation means, for example, removing a solvent, water, or the like taken into pores to increase the surface area for gas adsorption.

The metal organic framework according to embodiments of the present invention can be activated by heating under reduced pressure, specifically $10^{-1}$ Pa or less, preferably from $10^{-1}$ Pa to $10^{-4}$ Pa, to a temperature of from 40° C. to 200° C., preferably from 60° C. to 180° C.

This activation can also be carried out stepwise. The activation can be carried out by employing a first step of heating for from 1 to 4 hours at a temperature of from 40° C. to 60° C. under reduced pressure of $10^{-1}$ Pa or less and a second step of subsequently heating at a temperature of from 100° C. to 180° C. for from 5 to 50 hours.

Before activation treatment by heating the metal organic framework under reduced pressure, if necessary, to remove water and impurities adsorbed on the metal organic framework to be treated, the metal organic framework can be treated or washed with an organic solvent such as methanol, ethanol, or acetone.

The activated pellet (granule)-like metal organic framework has a granular, spherical, or cylindrical outer shape and an average particle size of from 0.1 mm to 5 mm, preferably from 0.5 mm to 3 mm. The average size of pores thereof is preferably from 0.3 nm to 20 nm (the evaluation method is the BJH method).

The number of pores present in the powdery metal organic framework and the size and shape of the pores tend to facilitate gas adsorption through the activation treatment.

<Adsorbent>

The adsorbent according to embodiments of the present invention is characterized by comprising the porous metal organic framework. The porous metal organic framework described herein means the above-described powdery porous metal organic framework and pellet (granule)-like metal organic framework, the above-described activated powdery porous metal organic framework and activated pellet (granule)-like metal organic framework, and the like.

When used as an adsorbent, the adsorption layer is filled with the adsorbent.

<Method for Separating Carbon Dioxide>

The method for separating carbon dioxide according to embodiments of the present invention is characterized by comprising the following steps (a) and (b):

step (a): a step of bringing a carbon dioxide-containing gas into contact with the porous metal organic framework, thereby allowing the porous metal organic framework to adsorb carbon dioxide in the carbon dioxide-containing gas; and step (b): a step of desorbing carbon dioxide adsorbed on the porous metal organic framework from the carbon-dioxide-adsorbed porous metal organic framework obtained in step (a).

The porous metal organic framework in step (b) means the above-described powdery porous metal organic framework and pellet (granule)-like metal organic framework, the above-described activated powdery porous metal organic framework and activated pellet (granule)-like metal organic framework, and the like.

Specifically, a carbon dioxide-containing gas can be a mixture containing carbon dioxide as an essential component and two or more components from among nitrogen, oxygen, methane, hydrogen, water vapor, and carbon monoxide as other gas components or a mixed gas of these gas components and other gas components. For example, coal-fired gas, natural gas, air, shale gas, or the like, or a gas substantially consisting only of carbon dioxide also corresponds to a carbon dioxide-containing gas.

The method for separating carbon dioxide according to embodiments of the present invention can be applied to a carbon dioxide-containing gas having a wide range of $CO_2$ partial pressures from 0.001 atm to 200 atm in the gas. In addition, the method for separating carbon dioxide according to embodiments of the present invention can be carried out at a temperature of preferably from 0° C. to 200° C.

The method for separating carbon dioxide according to embodiments of the present invention can be carried out by employing a pressure swing adsorption method or a temperature swing adsorption method.

The "pressure swing adsorption method" described herein refers to an adsorption separation method in which an adsorbent adsorbs carbon dioxide gas under increased pressure or normal pressure, and after removing non-adsorbed components, the pressure is reduced to desorb the adsorbed gas. In addition, the "temperature swing adsorption method" refers to an adsorption separation method in which an adsorbent adsorbs carbon dioxide gas at a normal or low temperature, and after removing non-adsorbed components, heating is performed to desorb the adsorbed gas.

In a case where the method for separating carbon dioxide employs a pressure swing adsorption method, step (b) includes a step of altering the porous metal organic framework (and its surroundings) to a pressure capable of desorbing carbon dioxide from the porous metal organic framework. The desorption pressure is preferably from 0.005 MPa to 2 MPa, more preferably from 0.01 MPa to 0.1 MPa.

Meanwhile, in a case where the method for separating carbon dioxide employs a temperature swing adsorption method, step (b) includes a step of increasing the temperature of the porous metal organic framework with carbon dioxide adsorbed to a temperature capable of desorbing carbon dioxide from the porous metal organic framework.

The desorption temperature is preferably from 303K to 473K, more preferably from 313K to 373K.

The method for separating carbon dioxide according to embodiments of the present invention comprises predetermined steps (a) and (b), in which each of steps (a) and (b) is performed at least once. Step (a) can be performed a plurality of times, and step (b) can also be performed a plurality of times. In addition, a step (one cycle) consisting of a combination of one step (a) and one step (b) can be repeated a plurality of times.

The method for separating carbon dioxide of the present invention encompasses, as a preferred embodiment, for example, a method in which steps (a) and (b) are carried out as follows.

(1) step (a)→step (b)
(2) step (a)→step (a)→step (b)
(3) step (a)→step (a)→step (a)→step (b)
(4) step (a)→step (b)→step (a)→step (b)
(5) step (a)→step (a)→step (b)→step (a)→step (b)

Although several embodiments of the present invention are described above, these embodiments are presented by way of example and are not intended to limit the scope of the invention. These embodiments can be implemented in various other forms, and various omissions, replacements, changes, or additions can be made without departing from the gist of the invention. These embodiments and their modifications are included in the scope and gist of the invention and are included in the scope of the invention described in the claims and equivalents thereof.

EXAMPLES

The present invention will be described in more detail below with reference to Examples and Comparative Examples, but the present invention is not limited to these Examples.

Example 1

Zinc oxalate (261 mg, 1.38 mmol), 1,2,4-triazole (361 mg, 5.2 mmol), and 1,2-di(4-pyridyl)ethylene (50 mg, 0.27 mmol) were placed in a 23 mL pressure-resistant autoclave container (manufactured by Teflon (registered trademark)), and water (4 mL) and methanol (6 mL) were sequentially added.

The pressure-resistant container containing the above-described mixture was placed in an oven. The temperature was raised to 180° C. over 2 hours, then maintained at 180° C. for about 48 hours, and then allowed to cool to room temperature over 12 hours. The content of the pressure-resistant container was purified, thereby obtaining a powdery porous metal organic framework (MOF). This MOF was allowed to adsorb 100% $CO_2$ gas at 20° C., and the adsorption amount was measured from the difference in weight before and after adsorption. The results are shown in Table 1.

Example 2

A powdery porous metal organic framework (MOF) was obtained in the same manner as in Example 1, except that 1,3-di(4-pyridyl)propane was used instead of 1,2-di(4-pyridyl)ethylene. This MOF was allowed to adsorb 100% $CO_2$ gas at 20° C., and the adsorption amount was measured from the difference in weight before and after adsorption. The results are shown in Table 1.

Example 3

A powdery porous metal organic framework (MOF) was obtained in the same manner as in Example 1, except that 3,3'-bipyridyl was used instead of 1,2-di(4-pyridyl)ethylene. This MOF was allowed to adsorb 100% $CO_2$ gas at 20° C., and the adsorption amount was measured from the difference in weight before and after adsorption. The results are shown in Table 1.

Example 4

A powdery porous metal organic framework (MOF) was obtained in the same manner as in Example 1, except that piperazine was used instead of 1,2-di(4-pyridyl)ethylene. This MOF was allowed to adsorb 100% $CO_2$ gas at 20° C., and the adsorption amount was measured from the difference in weight before and after adsorption. The results are shown in Table 1.

Comparative Example 1

A powdery porous metal organic framework (MOF) was obtained in the same manner as in Example 1, except that 1,2-di(4-pyridyl)ethylene was not added. This MOF was allowed to adsorb 100% $CO_2$ gas at 20° C., and the adsorption amount was measured from the difference in weight before and after adsorption. The results are shown in Table 1.

TABLE 1

|  | adsorption amount |
| --- | --- |
| Examples 1 | 1.05 |
| Examples 2 | 1.14 |
| Examples 3 | 1.09 |
| Examples 4 | 1.16 |
| Comparative Example 1 | 1.00 |

It was confirmed that Examples 1 to 4 had $CO_2$ recovered in an amount larger than that in Comparative Example 1.

The invention claimed is:

1. A porous metal organic framework, which is characterized by comprising an oxalate, a cycloazocarbyl compound, and a bidentate organic ligand, wherein the bidentate organic ligand is selected from the group consisting of 1,4-diazabicyclo[2.2.2]octane, pyrazine, 2,5-dimethylpyrazine, 3,3'-bipyridyl, 4,4'-bipyridyl, 2,2'-dimethyl-4,4'-bipyridine, 1,2-bis(4-pyridyl)ethane, 1,2-bis(4-pyridyl)ethylene, 1,2-bis(4-pyridyl)ethyne, 1,3-bis(4-pyridyl)propane, 1,4-bis(4-pyridyl)butane, 1,4-bis(4-pyridyl)butadiyne, 1,4-bis(4-pyridyl)benzene, 3,6-di(4-pyridyl)-1,2,4,5-tetrazine, 2,2'-bi-1,6-naphthyridine, phenazine, diazapyrene, 2,6-di(4-pyridyl)-benzo[1,2-c:4,5-c']dipyrrole-1,3,5,7(2H, 6H)-tetoron, 4,4'-bis(4-pyridyl)biphenylene, N,N'-di(4-pyridyl)-1,4,5,8-naphthalenetetracarboxydiimide, trans-1,2-bis(4-pyridyl)ethene, 4,4'-azopyridine, 1,2-bis(4-pyridyl)ethane, 4,4'-dipyridyl sulfide, 1,2-bis(4-pyridyl)propane, 1,2-bis(4-pyridyl)-glycol, N-(4-pyridyl)isonicotinamide, piperazine, and 2-methylpiperazine; and wherein the cycloazocarbyl compound is selected from the group consisting of 1,2,4-triazolate, 1H-1,2,4-triazolate-1-carboxamidine, 3-amino-1,2,4-triazolate, imidazolate, 4-fluoroimidazolate, 2-methyl-imidazolate, and 1,2,3,4-tetrazolate.

2. The porous metal organic framework according to claim 1, wherein a molar ratio of the bidentate organic compound to the cycloazocarbyl compound is from 0.02 to 0.1.

3. A method for producing a porous metal organic framework, which is characterized by comprising subjecting a metal oxalate, a cycloazocarbyl compound, and an organic ligand capable of bidentate coordination to a temperature condition of from 100° C. to 250° C. in the presence of a mixed solvent containing water and alcohol;

wherein the bidentate organic ligand is selected from the group consisting of 1,4-diazabicyclo[2.2.2]octane, pyrazine, 2,5-dimethylpyrazine, 3,3'-bipyridyl, 4,4'-bi-pyridyl, 2,2'-dimethyl-4,4'-bipyridine, 1,2-bis(4-pyridyl)ethane, 1,2-bis(4-pyridyl)ethylene, 1,2-bis(4-pyridyl)ethyne, 1,3-bis(4-pyridyl)propane, 1,4-bis(4-pyridyl)butane, 1,4-bis(4-pyridyl)butadiyne, 1,4-bis(4-pyridyl)benzene, 3,6-di(4-pyridyl)-1,2,4,5-tetrazine, 2,2'-bi-1,6-naphthyridine, phenazine, diazapyrene, 2,6-di(4-pyridyl)-benzo[1,2-c: 4,5-c']dipyrrole-1,3,5,7 (2H,6H)-tetoron, 4,4'-bis(4-pyridyl)biphenylene, N,N'-di(4-pyridyl)-1,4,5,8-naphthalenetetracarboxydiimide, trans-1,2-bis(4-pyridyl)ethene, 4,4'-azopyridine, 1,2-bis(4-pyridyl)ethane, 4,4'-dipyridyl sulfide, 1,2-bis(4-pyridyl)propane, 1,2-bis(4-pyridyl)-glycol, N-(4-pyridyl)isonicotinamide, piperazine, and 2-methylpiperazine; and wherein the cycloazocarbyl compound is selected from the group consisting of 1,2,4-triazolate, 1H-1,2,4-tri-azolate-1-carboxamidine, 3-amino-1,2,4-triazolate, imidazolate, 4-fluoroimidazolate, 2-methyl-imidazo-late, and 1,2,3,4-tetrazolate.

4. An adsorbent, which is characterized by comprising the porous metal organic framework according to claim 1.

5. A method for separating carbon dioxide, which is characterized by comprising the following steps (a) and (b):

step (a): a step of bringing a carbon dioxide-containing gas into contact with the porous metal organic framework according to claim 1, thereby allowing the porous metal organic framework to adsorb carbon dioxide in the carbon dioxide-containing gas; and step (b): a step of desorbing carbon dioxide adsorbed on the porous metal organic framework from the carbon-dioxide-adsorbed porous metal organic framework obtained in step (a).

* * * * *